United States Patent
Yamashiro et al.

(10) Patent No.: US 10,220,832 B2
(45) Date of Patent: Mar. 5, 2019

(54) VEHICLE AND METHOD FOR CONTROLLING ROTARY ELECTRIC MACHINE

(71) Applicant: HONDA MOTOR CO., LTD., Tokyo (JP)

(72) Inventors: Yoichi Yamashiro, Wako (JP); Shinji Mikami, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 79 days.

(21) Appl. No.: 15/438,763

(22) Filed: Feb. 22, 2017

(65) Prior Publication Data
US 2017/0282903 A1 Oct. 5, 2017

(30) Foreign Application Priority Data

Mar. 31, 2016 (JP) .................................. 2016-070007
Apr. 13, 2016 (JP) .................................. 2016-080196

(51) Int. Cl.
*B60L 9/00* (2006.01)
*B60W 20/40* (2016.01)
(Continued)

(52) U.S. Cl.
CPC ............ *B60W 20/40* (2013.01); *B60W 20/10* (2013.01); *F02N 11/0811* (2013.01);
(Continued)

(58) Field of Classification Search
CPC ... B60W 20/40; B60W 20/10; F02N 11/0811; F02N 11/101
(Continued)

(56) References Cited

U.S. PATENT DOCUMENTS

2013/0218391 A1* 8/2013 Aizawa .................. B60L 11/14
701/22
2015/0191167 A1* 7/2015 Itagaki .................. B60W 20/40
701/22
(Continued)

FOREIGN PATENT DOCUMENTS

JP 11-164406 6/1999
JP 2003-322073 11/2003
(Continued)

OTHER PUBLICATIONS

Japanese Office Action for corresponding JP Application No. 2016-080196, dated Nov. 28, 2017 (w/ English machine translation).
Japanese Office Action for corresponding JP Application No. 2016-080196, dated Aug. 15, 2017.

*Primary Examiner* — Thomas G Black
*Assistant Examiner* — Luat T Huynh
(74) *Attorney, Agent, or Firm* — Mori & Ward, LLP

(57) ABSTRACT

A vehicle includes a rotary electric machine, an internal combustion engine, a temperature sensor, and a limiter. The rotary electric machine generates power to move the vehicle. The internal combustion engine is started by the rotary electric machine to generate power to move the vehicle. The temperature sensor detects temperature of the rotary electric machine or of a drive circuit for the rotary electric machine. The limiter restricts the power generated by the rotary electric machine if the temperature is higher than a first threshold temperature. The start prohibitor prohibits the rotary electric machine from starting the internal combustion engine if the temperature is higher than a second threshold temperature which is higher than the first threshold temperature.

11 Claims, 4 Drawing Sheets

(51) Int. Cl.
*B60W 20/10* (2016.01)
*F02N 11/08* (2006.01)
*F02N 11/10* (2006.01)

(52) U.S. Cl.
CPC ..... *F02N 11/101* (2013.01); *B60W 2510/083* (2013.01); *B60W 2510/087* (2013.01); *B60W 2710/086* (2013.01); *F02N 2200/045* (2013.01); *Y10S 903/906* (2013.01)

(58) Field of Classification Search
USPC .......................................................... 701/22
See application file for complete search history.

(56) References Cited

U.S. PATENT DOCUMENTS

| | | | | |
|---|---|---|---|---|
| 2015/0367832 A1* | 12/2015 | Oshiumi | ............... | B60K 6/445 |
| | | | | 701/22 |
| 2016/0121876 A1* | 5/2016 | Cho | ...................... | B60L 3/0061 |
| | | | | 701/22 |
| 2016/0185250 A1* | 6/2016 | Izumi | .................. | B60L 11/1874 |
| | | | | 701/22 |

FOREIGN PATENT DOCUMENTS

| JP | 2004-340076 | | 12/2004 |
|---|---|---|---|
| JP | 2014-065383 | | 4/2014 |
| JP | 2014065383 A | * | 4/2014 |

\* cited by examiner

VEHICLE AND METHOD FOR CONTROLLING ROTARY ELECTRIC MACHINE

CROSS-REFERENCE TO RELATED APPLICATIONS

The present application claims priority under 35 U.S.C. § 119 to Japanese Patent Application No. 2016-070007, filed Mar. 31, 2016, entitled "Vehicle" and Japanese Patent Application No. 2016-080196, filed Apr. 13, 2016, entitled "Vehicle." The contents of these applications are incorporated herein by reference in their entirety.

BACKGROUND

1. Field

The present disclosure relates to a vehicle and a method for controlling a rotary electric machine.

2. Description of the Related Art

For example, Japanese Unexamined Patent Application Publication No. 11-164406 discloses a hybrid vehicle including an internal combustion engine that drives a drive axle of a vehicle, a motor that drives the drive axle by using electric energy, and an energy storage device that supplies electric power to the motor ([0016] and FIG. 1 of Japanese Unexamined Patent Application Publication No. 11-164406).

The internal combustion engine of such hybrid vehicles is started using the motor (i.e., a rotary electric machine) in place of a dedicated starter motor.

SUMMARY

According to one aspect of the present invention, a vehicle includes a rotary electric machine that drives the vehicle, an internal combustion engine that is started using the rotary electric machine in response to a request to start the internal combustion engine, a temperature sensor that detects temperature of the rotary electric machine or temperature of a drive circuit for the rotary electric machine, an output limiter that limits output of the rotary electric machine if a detected temperature obtained by the temperature sensor exceeds a first threshold temperature, and a start prohibitor that prohibits starting of the internal combustion engine using the rotary electric machine if the detected temperature exceeds a second threshold temperature that is higher than the first threshold temperature after the output of the rotary electric machine is limited.

According to another aspect of the present invention, a vehicle includes a rotary electric machine, an internal combustion engine, a temperature sensor, and a limiter. The rotary electric machine generates power to move the vehicle. The internal combustion engine is started by the rotary electric machine to generate power to move the vehicle. The temperature sensor detects temperature of the rotary electric machine or of a drive circuit for the rotary electric machine. The limiter restricts the power generated by the rotary electric machine if the temperature is higher than a first threshold temperature. The start prohibitor prohibits the rotary electric machine from starting the internal combustion engine if the temperature is higher than a second threshold temperature which is higher than the first threshold temperature.

According to further another aspect of the present invention, a method for controlling a rotary electric machine to generate power to move a vehicle which includes an internal combustion engine to be started by the rotary electric machine to generate power to move the vehicle, the method includes detecting temperature of the rotary electric machine or of a drive circuit for the rotary electric machine. The power generated by the rotary electric machine is restricted if the temperature is higher than a first threshold temperature. The rotary electric machine is prohibited from starting the internal combustion engine if the temperature is higher than a second threshold temperature which is higher than the first threshold temperature.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
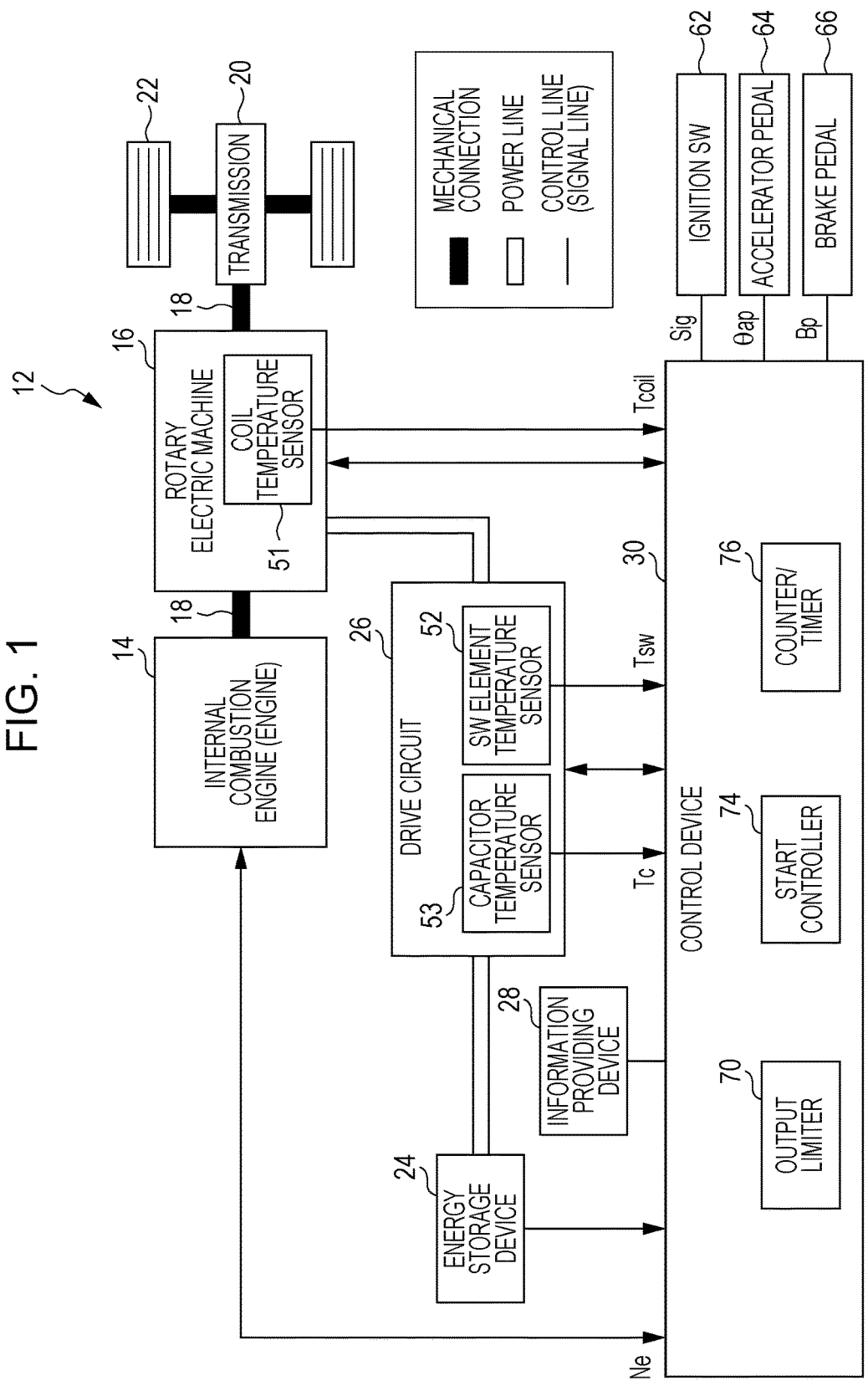
FIG. 1 is a schematic block diagram of a vehicle according to an embodiment.

The embodiments will now be described with reference to the accompanying drawings, wherein like reference numerals designate corresponding or identical elements throughout the various drawings.

A vehicle according to an embodiment of the present disclosure will be described in detail below with reference to the accompanying drawings.

Configuration

FIG. 1 is a schematic block diagram of a vehicle 12 according to the embodiment including a start controller 74 and other components.

Figure 2:
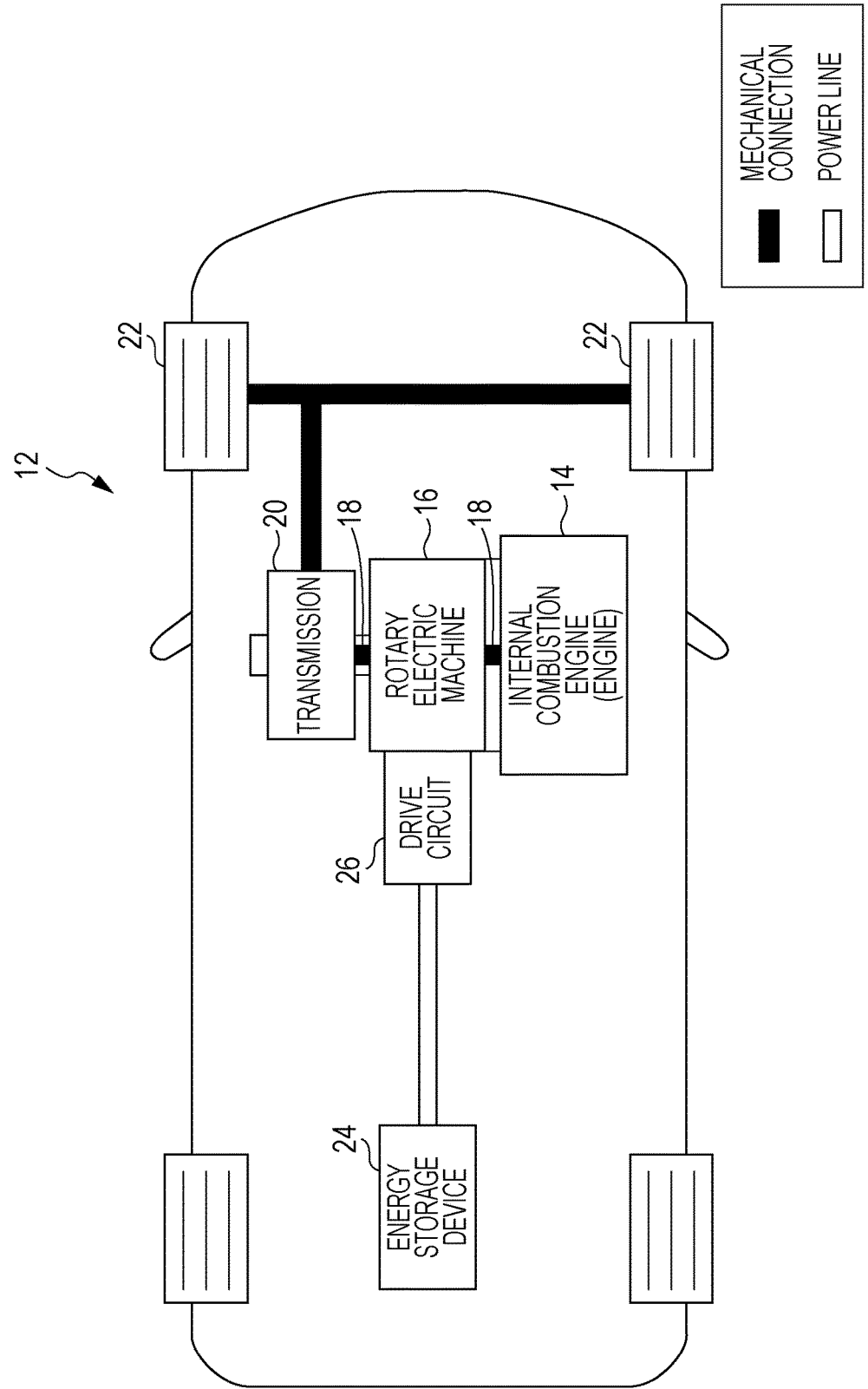
FIG. 2 is a schematic plan view of the vehicle.

FIG. 2 is a schematic plan view of the vehicle 12.

The vehicle 12 is a hybrid vehicle and includes an internal combustion engine (engine) 14, a rotary electric machine 16 such as a motor/generator, and driving wheels 22 that are driven to rotate by the internal combustion engine 14 and/or the rotary electric machine 16 via a drive axle 18 and a transmission 20.

Note that the vehicle 12 does not include a starter motor exclusively used to start the internal combustion engine 14. Instead, the internal combustion engine 14 is started using the rotary electric machine 16 capable of driving the vehicle 12.

In FIGS. 1 and 2, thick solid lines represent a mechanical connection, double solid lines represent a power line, and single solid lines represent a control line or a signal line.

When the internal combustion engine 14 is started and when the vehicle 12 travels using power of the rotary electric machine 16, the rotary electric machine 16 is driven to rotate by using alternating-current electric power obtained by converting direct-current electric power stored in an energy storage device 24, such as a high-voltage battery or a capacitor, via a drive circuit 26. In addition, during a regenerative period, the rotary electric machine 16 produces alternating-current electric power and charges the energy storage device 24 via the drive circuit 26.

The rotary electric machine 16 includes, for example, a stator (not illustrated) that is fixed to a housing and includes stator coils (not illustrated) wound around teeth, and a rotor (not illustrated) that includes a permanent magnet (not illustrated) therein and serves as a rotor disposed inside the stator with a space therebetween.

The temperature of the stator coils (coil temperature) Tcoil is detected by a coil temperature sensor 51 of the stator.

The drive circuit 26 includes a switching element (not illustrated) that constitutes an inverter, and circuit components such as a drive circuit (not illustrated) for the switching element and a smoothing capacitor (not illustrated). In the drive circuit 26, the temperature (switching element temperature) Tsw of the switching element is detected by a switching element temperature sensor (SW element temperature sensor) 52 and the temperature (capacitor temperature) Tc of the capacitor, which has the lowest upper temperature limit among the circuit components, is detected by a capacitor temperature sensor 53.

The temperatures of the stator coils wound around the teeth and the capacitor do not decrease easily since the stator coils and the capacitor have a high thermal mass. In contrast, the temperature of the switching element decreases easily since the switching element has a low thermal mass.

A control device 30 is supplied with detection signals from various sensors, such as the coil temperature Tcoil detected by the coil temperature sensor 51, the switching element temperature Tsw detected by the SW element temperature sensor 52, and the capacitor temperature Tc detected by the capacitor temperature sensor 53. The control device 30 is also supplied with switch state signals, such as an ignition signal Sig representing an on state or an off state of an ignition switch (SW) 62, a pedal position (accelerator pedal position) θap of an accelerator pedal 64 to which an accelerator pedal position sensor (not illustrated) is attached, and a depression amount (brake depression amount) Bp of a brake pedal 66 to which a brake pedal position sensor (not illustrated) is attached.

The control device 30 is a computer and includes a central processing unit (CPU), a memory, a counter/timer, and an input/output interface. The CPU executes a program stored in the memory, whereby the control device 30 functions as various functional units.

In this embodiment, the control device 30 functions as an output limiter 70 for the rotary electric machine 16, the start controller 74 that controls starting of the internal combustion engine 14 using the rotary electric machine 16, and a counter/timer (timepiece) 76, for example. The start controller 74 performs control so as to permit and prohibit starting of the internal combustion engine 14 and so as to actually start the internal combustion engine 14.

The control device 30 is connected to drive-related components of the vehicle 12, such as the internal combustion engine 14, the rotary electric machine 16, the energy storage device 24, and the drive circuit 26. The control device 30 executes a program on the basis of the ignition signal Sig representing the on/off state of the ignition switch 62; the accelerator pedal position θap and the brake depression amount Bp which are operation signals of the vehicle 12; and the coil temperature Tcoil, the switching element temperature Tsw, and the capacitor temperature Tc respectively detected by the coil temperature sensor 51, the SW element temperature sensor 52, and the capacitor temperature sensor 53, thereby controlling the drive-related components.

Note that the control device 30 may be provided separately for each of the major components, such as the internal combustion engine 14 and the rotary electric machine 16. When the control devices 30 are provided separately for the respective major components, the control devices 30 are interconnected by a communication line so as to share information and data.

An information providing device 28 is connected to the control device 30. The control device 30 supplies information to an occupant of the vehicle 12 via the information providing device 28 when necessary. A display/audio device (including a display and a speaker) disposed on the dashboard may be used as the information providing device 28.

The vehicle 12 having the above configuration can be driven using the internal combustion engine 14 alone (with the rotary electric machine 16 kept idling), using the rotary electric machine 16 alone (with the internal combustion engine 14 kept idling), and using both the internal combustion engine 14 and the rotary electric machine 16. Note that a clutch (engaging/disengaging mechanism) may be provided between the internal combustion engine 14 and the rotary electric machine 16.

In principle, the internal combustion engine 14 is started using the rotary electric machine 16 in response to a start request that is issued when the ignition switch 62 is switched from the off state (Sig=OFF: low level) to the on state (Sig=ON: high level) (when the state shifts from a stationary state to a ready-to-travel state) in the case where limitation of the output of the rotary electric machine 16 (referred to as power saving or power limitation), which is applied by the output limiter 70 on the basis of the temperatures detected by the coil temperature sensor 51, the SW element temperature sensor 52, and the capacitor temperature sensor 53, is not necessary. The internal combustion engine 14 is also started using the rotary electric machine 16 in response to a start request that is issued when the drive mode is switched from a rotary-electric-machine-16-alone mode in which the rotary electric machine 16 alone is used to drive the vehicle 12 to an internal-combustion-engine-14-alone mode while the vehicle 12 is traveling. Since relatively large torque (start torque) will be produced at the time of starting the internal combustion engine 14 using the rotary electric machine 16, the temperatures of the rotary electric machine 16 and the drive circuit 26 will increase considerably.

Operation Performed when Temperature Sensor is Operating Properly

An operation for controlling starting of the internal combustion engine 14 using the rotary electric machine 16 in the vehicle 12 according to this embodiment having the above-described configuration will be described with reference to a timing chart illustrated in FIG. 3. Note that, for better understanding, the timing chart illustrated in FIG. 3 will be described by using the coil temperature Tcoil detected by the coil temperature sensor 51 as an exemplary input value.

Figure 3:
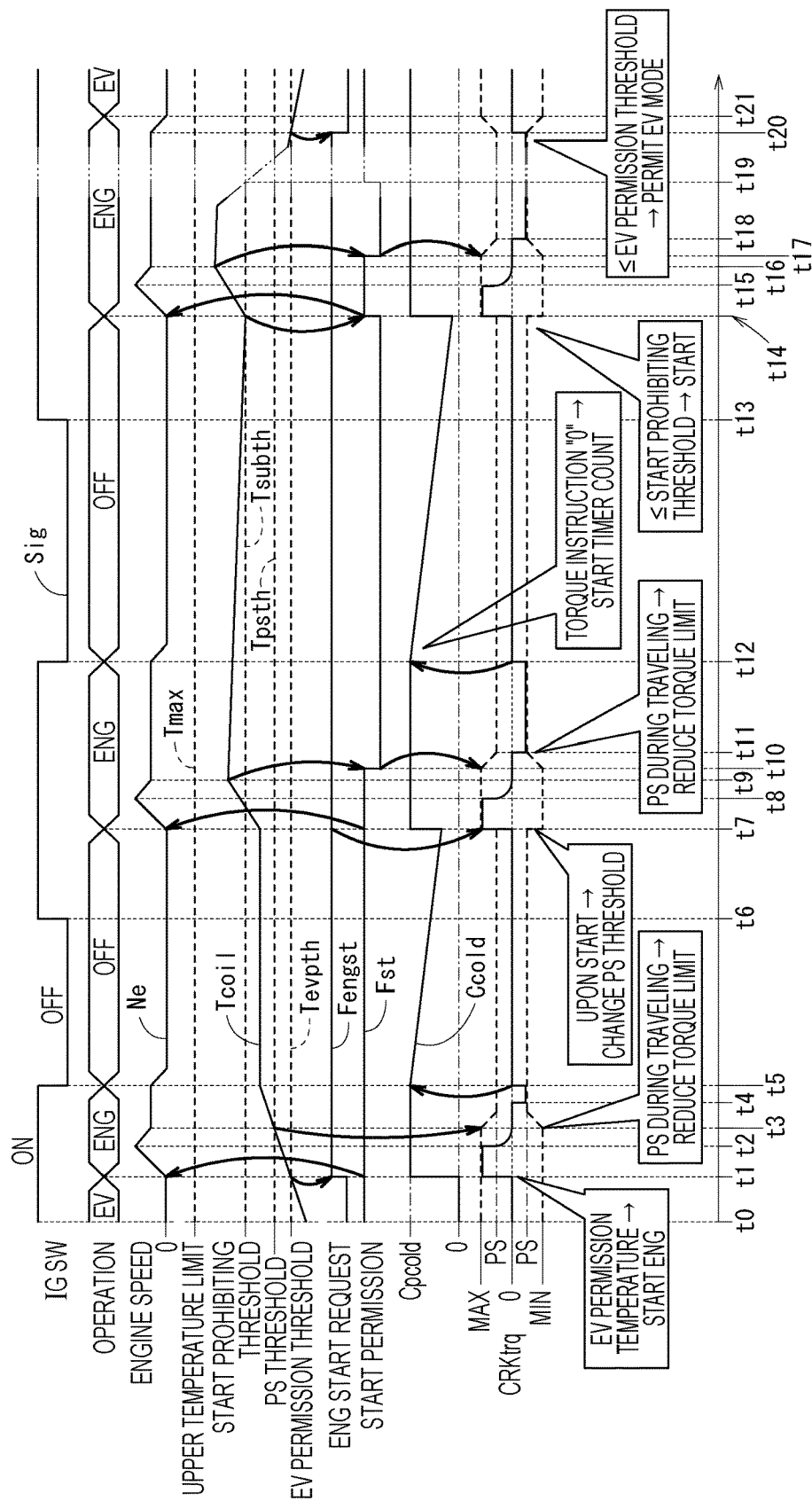
FIG. 3 is a timing chart used to describe a control operation performed to start an internal combustion engine when a temperature sensor is operating properly.

Items represented by waveforms illustrated in the timing chart of FIG. 3 are as follows:

(1) "IG SW" represents the on/off state of the ignition switch 62 {Sig=ON (high level), Sig=OFF (low level)};

(2) "OPERATION" includes "EV" which indicates traveling by using the rotary electric machine 16 alone (EV-alone mode), "ENG" which indicates traveling by using the internal combustion engine 14 alone or by using both the internal combustion engine 14 and the rotary electric machine 16, and "OFF" which indicates that both the internal combustion engine 14 and the rotary electric machine 16 are stopped;

(3) "ENGINE SPEED" represents an engine speed Ne [rpm];

(4) "Tcoil" represents the coil temperature, and threshold temperatures have a relationship of Tmax>Tsubth>Tpsth>Tevpth, where
   (4-1) Tmax represents the upper temperature limit for the coil temperature Tcoil,
   (4-2) Tsubth represents a start prohibiting threshold temperature at which starting of the internal combustion engine 14 using the rotary electric machine 16 is prohibited,
   (4-3) Tpsth represents a power-saving threshold temperature at which power saving (power limitation) is applied to the rotary electric machine 16; and
   (4-4) Tevpth represents an EV-alone-traveling permission threshold temperature (EV permission threshold temperature) that is an upper temperature limit up to which traveling by using the rotary electric machine 16 alone is permitted;
(5) "ENG START REQUEST" represents an internal combustion engine start request flag Fengst;
(6) "START PERMISSION" represents a start permission flag Fst for the internal combustion engine 14;
(7) "Ccold" represents a value to be counted down (countdown value), and "Cpcold" represents a preset sufficient cooling period (preset value); and
(8) "CRKtrq" represents cranking torque permitted for the rotary electric machine 16, "MAX" represents the maximum value (i.e., torque with which the internal combustion engine 14 is can be started), "PS" represents a power-saving value with which the internal combustion engine 14 cannot be started, and "MIN" represents the minimum value, where the positive value represents drive torque that causes the vehicle 12 to travel and the negative value represents regenerative torque (braking torque).

Referring to the timing chart illustrated in FIG. 3, a period from a time point t0 to a time point t1 is a period in which the vehicle 12 travels in the EV-alone mode by using the rotary electric machine 16 alone (see "(2) OPERATION" above).

The coil temperature Tcoil increases during this EV-based traveling period. Upon determining that the coil temperature Tcoil exceeds the EV-alone-traveling permission threshold temperature Tevpth at the time point t1, the control device 30 (specifically, the start controller 74) sets the internal combustion engine start request flag Fengst that has been reset. Note that the start permission flag Fst is kept in the set state (start permitted state).

Since the coil temperature Tcoil of the rotary electric machine 16 does not exceed the power-saving threshold temperature Tpsth at the time point t1, the start controller 74 sets the cranking torque CRKtrq of the rotary electric machine 16 to the maximum value MAX and drives, via the drive circuit 26, the rotary electric machine 16 to rotate so as to start the internal combustion engine 14 (from the time point t1 to a time point t2).

The EV-based traveling period is finished at the time point t1, and an engine-based traveling period starts at the time point t1.

The coil temperature Tcoil exceeds the power-saving threshold temperature Tpsth at a time point t3, in response to which the output limiter 70 sets the threshold for the cranking torque CRKtrq of the rotary electric machine 16 to the power-saving value PS, which is substantially half the maximum value MAX. With this setting, the drive circuit 26 is prohibited from supplying the rotary electric machine 16 with electric power (current) that exceeds the power-saving value PS.

Note that the power-saving threshold temperature Tpsth is set to a threshold temperature at which starting of the internal combustion engine 14 (starting of the engine) is permitted only once if the coil temperature Tcoil is lower than or equal to the start prohibiting threshold temperature Tsubth.

The brake pedal 66, instead of the accelerator pedal 64, is depressed at a time point t4. That is, the accelerator pedal 64 is released, and the accelerator pedal position θap of 0 is detected at the time point t4. The rotary electric machine 16 is driven in the regenerative mode from the time point t4 to a time point t5 at which the off state of the ignition switch 62 is detected based on the ignition signal Sig=0 (OFF), and the energy storage device 24 is charged via the drive circuit 26 under the control of the control device 30.

As a result of the ignition switch 62 is switched from the on state to the off state at the time point t5, the rotary electric machine 16 is stopped and cooling is started in a soak state. Thus, the start controller 74 sets the cranking torque CRKtrq to a target torque of "0" and starts the counter/timer 76, which is set in advance to the preset sufficient cooling period (preset value) Cpcold, to count down (to count time or decrease the remaining time) at the time point t5.

Upon detecting switching of the ignition switch 62 from the off state to the on state at a time point t6, the start controller 74 changes the cranking torque CRKtrq from the power-saving value PS to the maximum value MAX after a processing standby period from the time point t6 to a time point t7 and causes the internal combustion engine 14 to be started in a period from the time point t7 to a time point t8 (Tcoil<Tsubth).

The coil temperature Tcoil barely decreases during a stationary period of the vehicle 12 from the time point t5 to the time point t7 (when the rotary electric machine 16 and the internal combustion engine 14 are stopped) because the heat capacity (i.e., the thermal mass) of the coils and the stator core is high.

Accordingly, the coil temperature Tcoil starts increasing again from the time point t7, and the start controller 74 detects, before a time point t8, that the coil temperature Tcoil exceeds the start prohibiting threshold temperature Tsubth at which the starting of the internal combustion engine 14 using the rotary electric machine 16 is prohibited.

The start controller 74 again sets the counter/timer 76 to the preset sufficient cooling period Cpcold at the time point t7 but does not start the counter/timer 76 to count down (decrease the remaining time) because the internal combustion engine 14 is operating.

The coil temperature Tcoil starts to decrease at a time point t9 thanks to an air inflow. However, since the coil temperature Tcoil has exceeded the start prohibiting threshold temperature Tsubth, the start controller 74 resets the start permission flag Fst (to be in the not-permitted or prohibited state) at a time point t10 after completion of start processing so as to prohibit restarting.

At and after a time point t11, the output limiter 70 sets a during-traveling power-saving state and decreases the torque limit. In a period after the time point t11 immediately before a time point t12, the rotary electric machine 16 is driven by the internal combustion engine 14 as a generator, and the energy storage device 24 is charged with generated electric power via the drive circuit 26. The brake pedal 66, instead of the accelerator pedal 64, is depressed immediately before the time point t12. At the time point t12, the driver switches off the ignition switch 62.

Upon detecting switching off of the ignition switch 62, the start controller 74 sets the cranking torque CRKtrq to a target torque of "0" and causes the counter/timer 76 to start counting down (reducing the remaining time) from the preset sufficient cooling period Cpcold at the time point t12.

When the ignition switch 62 is switched from off to on at a time point t13, the start controller 74 prohibits the starting of the internal combustion engine 14 until the coil temperature Tcoil becomes lower than the start prohibiting threshold temperature Tsubth at a time point t14. At the time point t14, the start permission flag Fst is set to cancel the prohibition, and the internal combustion engine 14 is started using the rotary electric machine 16.

The counter/timer 76 has not completed (finished) counting down the preset sufficient cooling period Cpcold at the time point t14; however, since the coil temperature Tcoil has become lower than the start prohibiting threshold temperature Tsubth, the internal combustion engine 14 is started using the rotary electric machine 16 and the counter/timer 76 is set again to the preset sufficient cooling period Cpcold.

After an increase in the coil temperature Tcoil is detected at a time point t16 and the start processing is finished at a time point t17, the start controller 74 that also functions as a start prohibitor resets the start permission flag Fst for the internal combustion engine 14 at the time point t17 and sets the rotary electric machine 16 in the power-saving state via the output limiter 70 to prohibit the starting at and after a time point t18 (because Tcoil>Tsubth).

Thereafter, when the coil temperature Tcoil becomes lower than the start prohibiting threshold temperature Tsubth at a time point t19 thanks to an air inflow while the vehicle 12 is traveling by using the internal combustion engine 14, the start controller 74 sets the start permission flag Fst.

Further, when the coil temperature Tcoil becomes lower than the EV-alone-traveling permission threshold temperature Tevpth at a time point t20, the start controller 74 resets the internal combustion engine start request flag Fengst and the control device 30 permits driving (traveling) of the vehicle 12 by using the rotary electric machine 16 alone. At a time point t21, the power saving set by the output limiter 70 is cancelled, and the control device 30 switches the drive mode to the EV mode.

Summary of Operation Performed when Temperature Sensor is Operating Properly

As described above, in accordance with the embodiment described above, the output of the rotary electric machine 16 is limited (for example, at the time point t3) at a temperature (first threshold temperature: the power-saving threshold temperature Tpsth) that is lower than a temperature (second threshold temperature: the start prohibiting threshold temperature Tsubth) at which starting of the internal combustion engine 14 is prohibited so that driving torque needed to start the internal combustion engine 14 can be output even in the case where an attempt is made to restart the internal combustion engine 14 (for example, at the time point t6) after the internal combustion engine 14 is stopped (for example, at the time point t5) with the output of the rotary electric machine 16 being limited (with the power being saved or limited).

Consequently, the output of the rotary electric machine 16 is limited by the output limiter 70 when the coil temperature Tcoil exceeds the power-saving threshold temperature Tpsth (i.e., first threshold temperature), and a situation where the coil temperature Tcoil increases to the upper temperature limit Tmax after exceeding the power-saving threshold temperature Tpsth (i.e., first threshold temperature) is suppressed.

Accordingly, occurrence of a situation where temperature such as the coil temperature Tcoil exceeds the start prohibiting threshold temperature Tsubth (i.e., the second threshold temperature) is minimized even if the temperature exceeds the power-saving threshold temperature Tpsth (i.e., the first threshold temperature) during driving. For example, in the case where the internal combustion engine 14 is stopped (for example, at the time point t5 or t12) after the temperature has exceeded the power-saving threshold temperature Tpsth (i.e., the first threshold temperature) and thereafter an attempt is made to start the internal combustion engine 14 (for example, at the time point t6 or t13), starting of the internal combustion engine 14 using the rotary electric machine 16 is permitted (at the time point t7 corresponding to the time point t6 or at the time point t14 corresponding to the time point t13).

As described above, in accordance with the embodiment described above, even if the coil temperature Tcoil, which is the temperature of the rotary electric machine 16, or the switching element temperature Tsw or the capacitor temperature Tc, which is the temperature of the drive circuit 26 for the rotary electric machine 16, exceeds the power-saving threshold temperature Tpsth (i.e., the first threshold temperature) during driving and the output of the rotary electric machine 16 is limited by the output limiter 70, starting of the internal combustion engine 14 using the rotary electric machine 16 is permitted once and a situation where the coil temperature Tcoil, the switching element temperature Tsw, or the capacitor temperature Tc reaches the upper temperature limit Tmax is successfully avoided.

More specifically, in accordance with the embodiment described above, in principle, the internal combustion engine 14 of the vehicle 12 is started using the rotary electric machine 16 when the ignition switch 62 is switched from off to on (at the time point t6 or t13) or in response to a system request (at the time point t1, t7, or t14) issued when the ignition switch 62 is on.

The coil temperature sensor 51 detects the temperature of the rotary electric machine 16 (coil temperature Tcoil).

The SW element temperature sensor 52 and the capacitor temperature sensor 53 respectively detect the switching element temperature Tsw and the capacitor temperature Tc in the drive circuit 26 for the rotary electric machine 16.

The output limiter 70 limits the output (saves the power) of the rotary electric machine 16 (at the time point t3, t10, or t17) if the detected temperature (the coil temperature Tcoil) detected by the temperature sensor (the coil temperature sensor 51 in the above embodiment) exceeds the first threshold temperature (the power-saving threshold temperature Tpsth).

The start controller (start prohibitor) 74 performs exceptional control to prohibit the starting of the internal combustion engine 14 using the rotary electric machine 16 (from the time point t13 to the time point t14) if the detected temperature (coil temperature Tcoil) exceeds the second threshold temperature (start prohibiting threshold temperature Tsubth) that is higher than the first threshold temperature (power-saving threshold temperature Tpsth) even after the output of the rotary electric machine 16 has been limited.

In accordance with this embodiment, the output of the rotary electric machine 16 is limited if the detected temperature (coil temperature Tcoil) of the rotary electric machine 16 capable of starting the internal combustion engine 14 or the detected temperature (capacitor temperature Tc or switching element temperature Tsw) of the drive circuit 26 for the rotary electric machine 16 exceeds the first threshold temperature (power-saving threshold temperature Tpsth) (if Tcoil>Tpsth). In this way, control is performed so that the detected temperature (coil temperature Tcoil) does not exceed the second threshold temperature (start prohibiting threshold temperature Tsubth) that is higher than the first threshold temperature (power-saving threshold temperature Tpsth) and starting of the internal combustion engine 14 using the rotary electric machine 16 is permitted (at the time point t7) in principle.

In this case, the second threshold temperature (start prohibiting threshold temperature Tsubth) is set such that the detected temperature (coil temperature Tcoil) does not reach the upper temperature limit (the upper temperature limit Tmax of the coil temperature Tcoil) of the rotary electric machine 16 or the drive circuit 26 even if the internal combustion engine 14 is started once (from the time point t7 to the time point t9) when the detected temperature (coil temperature Tcoil) is higher than the first threshold (power-saving threshold temperature Tpsth) but is lower than the second threshold temperature (start prohibiting threshold temperature Tsubth).

In this embodiment, starting of the internal combustion engine 14 is permitted once (at the time point t7) if the detected temperature (coil temperature Tcoil) detected by the temperature sensor (coil temperature sensor 51) is higher than the first threshold temperature (power-saving threshold temperature Tpsth) but is lower than the second threshold temperature (start prohibiting threshold temperature Tsubth) when the output of the rotary electric machine 16 is limited because the detected temperature (coil temperature Tcoil) has exceeded the first threshold temperature (power-saving threshold temperature Tpsth). Accordingly, control is successfully performed such that the starting of the internal combustion engine 14 using the rotary electric machine 16 is permitted and the detected temperature (coil temperature Tcoil) does not reach the upper temperature limit (upper temperature limit Tmax of the coil temperature Tcoil) of the rotary electric machine 16 or the drive circuit 26.

The coil temperature Tcoil detected by the coil temperature sensor 51 does not decrease easily after the power saving is set because the coils wound around the teeth of the rotary electric machine 16, that is, the stator, has a high thermal mass. Thus, an amount of power saving and the preset sufficient cooling period (preset value) Cpcold are set for the coil temperature Tcoil in accordance with such a property.

Appropriate first threshold temperature, second threshold temperature, start prohibiting threshold temperature, upper temperature limit, amount of power saving, and preset sufficient cooling period (preset value) Cpcold are also set in advance for the switching element temperature Tsw and the capacitor temperature Tc. In this case, the amount of power-saving set for the switching element and the amount of power-saving set for the capacitor are smaller than the amount of power saving set for the coils. For example, the amount of power-saving of several tens of [Nm] is set for the coils, whereas half the amount of power-saving is set for the switching element and the capacitor. A value corresponding to a long period needs to be set for the capacitor as the present sufficient cooling period (preset value) Cpcold because the capacitor has a high thermal mass just like the coils, whereas the preset sufficient cooling period (preset value) Cpcold may be set to be extremely short for the switching element because the switching element has a low thermal mass.

Operation Performed when Temperature Sensor is not Operating Properly

Figure 4:
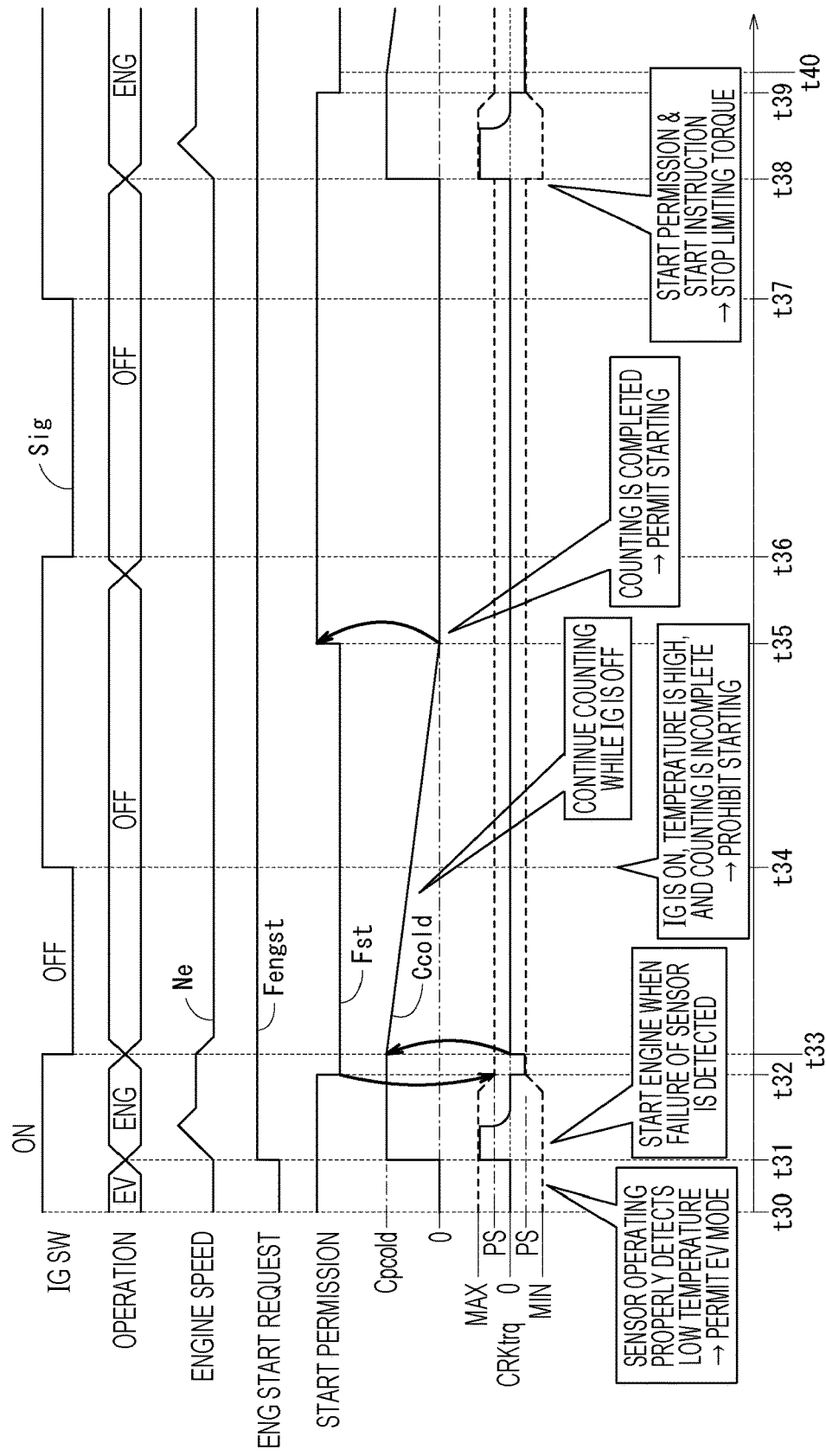
FIG. 4 is a timing chart used to describe a control operation performed to start the internal combustion engine when the temperature sensor is not operating properly.

An operation for controlling starting of the internal combustion engine 14 of the vehicle 12 according to this embodiment in the case where the temperature sensor is not operating properly (when the detected value is fixed, for example) will be described next with reference to a timing chart illustrated in FIG. 4.

In a period from a time point t30 to a time point t31, the temperature sensor is operating properly and the detected temperature (coil temperature Tcoil) does not exceed the power-saving threshold temperature Tpsth (first threshold temperature) and is low. Thus, this period is the EV-based traveling period in which the rotary electric machine 16 is used.

Upon the control device 30 detecting a change in the state of the vehicle 12 at the time point t31, the start controller 74 sets the internal combustion engine start request flag Fengst at the time point t31, sets the cranking torque CRKtrq of the rotary electric machine 16 to the maximum value MAX, and causes the rotary electric machine 16 to rotate so as to start the internal combustion engine 14 (from the time point t31 to a time point t32).

The engine-based traveling period is started at the time point t31, and at around the time point t31, the control device 30 detects that something is wrong with at least one of the coil temperature sensor 51, the SW element temperature sensor 52, and the capacitor temperature sensor 53.

Since it has been detected that something is wrong with the temperature sensor, the start controller 74 resets the start permission flag Fst and sets the rotary electric machine 16 in the power-saving state via the output limiter 70 at the time point t32 after performing the start processing once.

At the time point t32, the brake pedal 66 is depressed instead of the accelerator pedal 64. The rotary electric machine 16 is stopped at a time point t33 at which the ignition switch 62 is switched off, and cooling of the rotary electric machine 16 is started in the soak state.

At the time point t33, the start controller 74 causes the drive circuit 26 to stop driving the rotary electric machine 16 so that the driving torque produced by the rotary electric machine 16 becomes equal to "0". The start controller 74 also causes the counter/timer 76, which has been set in advance to the preset sufficient cooling period Cpcold, to start counting down (measuring time or reducing the remaining time).

Countdown is continued while the ignition switch 62 is kept off from the time point t33 to the time point t34.

At a time point t34, the ignition switch 62 that has been off is switched on. In this case, the start controller 74 assumes that the detected temperature is high because the counter/timer 76 has not completed counting down and prohibits (does not permit) the starting of the internal combustion engine 14.

At the time point t34, the control device 30 displays a message indicating that the temperature of the drive motor is high and the starting of the engine is not permitted on a display device of the information providing device 28. The control device 30 also displays a message asking the occupant to temporarily switch off the ignition switch 62 and to switch on the ignition switch 62 again after a while. These messages may be output as sound by using a speaker of the information providing device 28.

After the countdown is finished at a time point t35, the start controller 74 sets the start permission flag Fst.

Although the ignition switch 62 is on at the time point t35, the start controller 74 does not cause the internal combustion engine 14 to be started.

When the driver switches off the ignition switch 62 at a time point t36 and then switches on the ignition switch 62 at a time point t37, the start controller 74 detects the switching.

At that time, the start controller 74 outputs a start instruction because the start permission flag Fst is set. In this way, the power-saving (torque limiting) state is cancelled via the output limiter 70.

At a time point t38, the start controller 74 sets the cranking torque CRKtrq of the rotary electric machine 16 to the maximum value MAX via the drive circuit 26 and drives the rotary electric machine 16 to rotate so as to start the internal combustion engine 14 (from the time point t38 to a time point t39).

At and after the time point t39, the rotary electric machine 16 is driven as a generator by the internal combustion engine 14.

Since it has been detected that something is wrong with the temperature sensor, control is performed such that the power-saving state is not cancelled at and after a time point t40.

Summary of Operation Performed when Temperature Sensor is not Operating Properly When a failure of at least one temperature sensor out of the coil temperature sensor 51, the SW element temperature sensor 52, and the capacitor temperature sensor 53 is detected (at the time point t31), the starting of the internal combustion engine 14 using the rotary electric machine 16 is permitted (at the time point t35) after a period necessary for the detected temperature to decrease to a temperature at which the starting of the internal combustion engine 14 is permitted (the longest period among the preset sufficient cooling periods Cpcold set for the temperature sensors that have failed) passes since the driving torque (or output) of the rotary electric machine 16 becomes zero (at the time point t33 or t40).

In accordance with this embodiment, even in the case where the temperature sensor fails, starting of the internal combustion engine 14 using the rotary electric machine 16 is permitted and a situation where the coil temperature Tcoil of the rotary electric machine 16 or the switching element temperature Tsw or the capacitor temperature Tc of the drive circuit 26 for the rotary electric machine 16 reaches the upper temperature limit Tmax thereof is successfully avoided.

It should be noted that the present disclosure is not limited to the embodiment described above, and it is obvious that various configurations can be employed on the basis of the description of this specification, such as the use of temperature (including estimated temperature) of a magnet serving as a field magnet of the rotary electric machine 16.

According to a first aspect of the embodiment, a vehicle includes a rotary electric machine that drives the vehicle, an internal combustion engine that is started using the rotary electric machine in response to a request to start the internal combustion engine, a temperature sensor that detects temperature of the rotary electric machine or temperature of a drive circuit for the rotary electric machine, an output limiter that limits output of the rotary electric machine if a detected temperature obtained by the temperature sensor exceeds a first threshold temperature, and a start prohibitor that prohibits starting of the internal combustion engine using the rotary electric machine if the detected temperature exceeds a second threshold temperature that is higher than the first threshold temperature after the output of the rotary electric machine is limited.

According to the first aspect, to enable driving torque needed to start the internal combustion engine to be output when an attempt is made to restart the internal combustion engine after the internal combustion engine has been stopped with the output of the rotary electric machine being limited, the output of the rotary electric machine is limited at a temperature (first threshold temperature) that is lower than a temperature (second threshold temperature) up to which starting of the internal combustion engine using the rotary electric machine is permitted.

That is, in accordance with the first aspect, the output of the rotary electric machine that is used to start the internal combustion engine is limited when the detected temperature of the rotary electric machine or the detected temperature of the drive circuit for the rotary electric machine has exceeded the first threshold temperature. In this way, the detected temperature is controlled not to exceed the second threshold temperature that is higher than the first threshold temperature in principle and starting of the internal combustion engine using the rotary electric machine is permitted. Thus, the decrease in the product marketability is avoided.

If the detected temperature exceeds the second threshold temperature that is higher than the first threshold temperature even after the output of the rotary electric machine has been limited, starting of the internal combustion engine using the rotary electric machine is prohibited. With such a configuration, damages are successfully avoided because the temperature of the rotary electric machine or the temperature of the drive circuit for the rotary electric machine does not reach the upper temperature limit.

According to a second aspect of the embodiment, the second threshold temperature may be set such that the detected temperature does not reach an upper temperature limit of the rotary electric machine or the drive circuit even if the internal combustion engine is started once when the detected temperature is higher than the first threshold temperature but is lower than the second threshold temperature.

According to the second aspect, starting of the internal combustion engine is permitted once if the detected temperature detected by the temperature sensor is higher than the first threshold temperature but is lower than the second threshold temperature when the output of the rotary electric machine is limited as a result of the detected temperature exceeding the first threshold temperature. Thus, control is successfully performed so that starting of the internal combustion engine using the rotary electric machine is permitted and the detected temperature does not reach the upper temperature limit of the rotary electric machine or the drive circuit.

According to a third aspect of the embodiment, if the temperature sensor fails, starting of the internal combustion engine using the rotary electric machine may be permitted after a predetermined period necessary for the temperature to decrease to a temperature at which starting of the internal combustion engine is permitted passes since driving torque of the rotary electric machine becomes zero.

According to the third aspect, even if the temperature sensor fails, starting of the internal combustion engine using the rotary electric machine is permitted after a predetermined period needed for the temperature to decrease to a temperature at which starting of the internal combustion engine is permitted passes since the driving torque of the rotary electric machine becomes zero, and a situation where the temperature of the rotary electric machine or the drive circuit for the rotary electric machine reaches the upper temperature limit is successfully avoided.

According to the aspects of the embodiment, to enable driving torque needed to start the internal combustion engine to be output when an attempt is made to restart the internal combustion engine after the internal combustion engine has been stopped with the output of the rotary electric machine being limited, the output of the rotary electric machine is limited at a temperature (first threshold temperature) that is lower than a temperature (second threshold temperature) up to which starting of the internal combustion engine using the rotary electric machine is permitted.

That is, in accordance with the aspects, the output of the rotary electric machine that is used to start the internal combustion engine is limited when the detected temperature of the rotary electric machine or the detected temperature of the drive circuit for the rotary electric machine has exceeded the first threshold temperature. In this way, the detected temperature is controlled not to exceed the second threshold temperature that is higher than the first threshold temperature in principle, and starting of the internal combustion engine using the rotary electric machine is permitted. Thus, the decrease in the product marketability is avoided.

Accordingly, according to the aspects, starting of the internal combustion engine using the rotary electric machine is permitted whenever the situation allows, and control is successfully performed so that the temperature of the rotary electric machine or the temperature of the drive circuit for the rotary electric machine does not reach the upper temperature limit.

Obviously, numerous modifications and variations of the present invention are possible in light of the above teachings. It is therefore to be understood that within the scope of the appended claims, the invention may be practiced otherwise than as specifically described herein.

What is claimed is:

1. A vehicle comprising:
    a rotary electric machine that drives the vehicle;
    an internal combustion engine that is started using the rotary electric machine in response to a request to start the internal combustion engine;
    a temperature sensor that detects temperature of the rotary electric machine or temperature of a drive circuit for the rotary electric machine;
    a start controller that starts the internal combustion engine using the rotary electric machine if a detected temperature obtained by the temperature sensor exceeds an EV-alone-traveling permission threshold temperature that is an upper temperature limit up to which traveling by using the rotary electric machine alone is permitted;
    an output limiter that limits output of the rotary electric machine if the detected temperature obtained by the temperature sensor after the internal combustion engine is started using the rotary electric machine exceeds a first threshold temperature that is higher than the EV-alone-traveling permission threshold temperature; and
    a start prohibitor that prohibits starting of the internal combustion engine using the rotary electric machine if the detected temperature exceeds a second threshold temperature that is higher than the first threshold temperature after the output of the rotary electric machine is limited.

2. The vehicle according to claim 1, wherein the second threshold temperature is set such that the detected temperature does not reach an upper temperature limit of the rotary electric machine or the drive circuit even if the internal combustion engine is started once when the detected temperature is higher than the first threshold temperature but is lower than the second threshold temperature.

3. The vehicle according to claim 1, wherein if the temperature sensor fails, starting of the internal combustion engine using the rotary electric machine is permitted after a predetermined period necessary for the temperature to decrease to a temperature at which starting of the internal combustion engine is permitted passes since driving torque of the rotary electric machine becomes zero.

4. The vehicle according to claim 1, wherein the output limiter limits the output of the rotary electric machine when an ignition switch is turned on.

5. A vehicle comprising:
    a rotary electric machine to generate power to move the vehicle;
    an internal combustion engine to be started by the rotary electric machine to generate power to move the vehicle;
    a temperature sensor to detect temperature of the rotary electric machine or of a drive circuit for the rotary electric machine;
    a start controller to start the internal combustion engine by the rotary electric machine if the temperature is higher than an EV-alone-traveling permission threshold temperature that is an upper temperature limit up to which traveling of the vehicle by the rotary electric machine alone is permitted;
    a limiter to restrict the power generated by the rotary electric machine if the temperature is higher than a first threshold temperature after the internal combustion engine is started by the rotary electric machine, the first threshold temperature being higher than the EV-alone-traveling permission threshold temperature; and
    a start prohibitor to prohibit the rotary electric machine from starting the internal combustion engine if the temperature is higher than a second threshold temperature which is higher than the first threshold temperature.

6. The vehicle according to claim 5, wherein the second threshold temperature is set such that the temperature does not reach an upper temperature limit of the rotary electric machine or the drive circuit even if the internal combustion engine is started once when the temperature is higher than the first threshold temperature but is lower than the second threshold temperature.

7. The vehicle according to claim 5, wherein if the temperature sensor fails, starting of the internal combustion engine using the rotary electric machine is permitted after a predetermined period necessary for the temperature to decrease to a temperature at which starting of the internal combustion engine is permitted passes since driving torque of the rotary electric machine becomes zero.

8. The vehicle according to claim 5, wherein the limiter restricts the power when an ignition switch is turned on.

9. A method for controlling a rotary electric machine to generate power to move a vehicle which includes an internal combustion engine to be started by the rotary electric machine to generate power to move the vehicle, the method comprising:
    detecting temperature of the rotary electric machine or of a drive circuit for the rotary electric machine;
    starting the internal combustion engine by the rotary electric machine if the temperature is higher than an EV-alone-traveling permission threshold temperature that is an upper temperature limit up to which traveling of the vehicle by the rotary electric machine alone is permitted;
    restricting the power generated by the rotary electric machine if the temperature is higher than a first threshold temperature after the internal combustion engine is started by the rotary electric machine, the first threshold temperature being higher than the EV-alone-traveling permission threshold temperature; and
    prohibiting the rotary electric machine from starting the internal combustion engine if the temperature is higher than a second threshold temperature which is higher than the first threshold temperature.

10. The method according to claim 9,
wherein the temperature of the rotary electric machine or of the drive circuit for the rotary electric machine is detected by a temperature sensor, and
wherein if the temperature sensor fails, starting of the internal combustion engine using the rotary electric machine is permitted after a predetermined period necessary for the temperature to decrease to a temperature at which starting of the internal combustion engine is permitted passes since driving torque of the rotary electric machine becomes zero.

11. The method according to claim 9, wherein the power is restricted when an ignition switch is turned on.

* * * * *